(12) United States Patent
Huo et al.

(10) Patent No.: US 8,520,916 B2
(45) Date of Patent: Aug. 27, 2013

(54) ENHANCEMENT OF REGION OF INTEREST OF RADIOLOGICAL IMAGE

(75) Inventors: Zhimin Huo, Pittsford, NY (US); Minjie Chen, Shanghai (CN); Jing Zhang, Shanghai (CN); David H. Foos, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1023 days.

(21) Appl. No.: 12/033,031

(22) Filed: Feb. 19, 2008

(65) Prior Publication Data

US 2009/0129657 A1    May 21, 2009

Related U.S. Application Data

(60) Provisional application No. 60/989,149, filed on Nov. 20, 2007.

(51) Int. Cl.
G06K 9/00    (2006.01)
G06K 9/40    (2006.01)

(52) U.S. Cl.
USPC ........... 382/128; 382/132; 382/131; 382/130; 382/100; 382/254; 382/274; 382/275

(58) Field of Classification Search
USPC .......................... 382/100, 275, 254, 128, 276
See application file for complete search history.

(56) References Cited

U.S. PATENT DOCUMENTS

| | | | | |
|---|---|---|---|---|
| 4,460,962 A * | 7/1984 | Pape et al. | | 701/71 |
| 4,761,819 A * | 8/1988 | Denison et al. | | 382/261 |
| 4,974,597 A * | 12/1990 | Walloch | | 600/493 |
| 5,487,172 A * | 1/1996 | Hyatt | | 712/32 |
| 5,528,703 A * | 6/1996 | Lee | | 382/257 |
| 5,740,268 A * | 4/1998 | Nishikawa et al. | | 382/132 |
| 5,768,440 A * | 6/1998 | Campanelli et al. | | 382/261 |
| 5,781,640 A * | 7/1998 | Nicolino, Jr. | | 381/73.1 |
| 5,790,690 A * | 8/1998 | Doi et al. | | 382/128 |
| 5,832,103 A * | 11/1998 | Giger et al. | | 382/130 |
| 5,832,134 A * | 11/1998 | Avinash et al. | | 382/257 |
| 5,970,164 A * | 10/1999 | Bamberger et al. | | 382/128 |
| 6,075,871 A * | 6/2000 | Simanovsky et al. | | 382/100 |
| 6,078,680 A * | 6/2000 | Yoshida et al. | | 382/128 |
| 6,157,748 A * | 12/2000 | Taleblou et al. | | 382/288 |
| 6,251,601 B1 * | 6/2001 | Bao et al. | | 435/6.14 |
| 6,529,211 B2 * | 3/2003 | Ohara et al. | | 345/690 |
| 6,735,330 B1 | 5/2004 | VanMetter et al. | | |
| 6,985,612 B2 * | 1/2006 | Hahn | | 382/128 |
| 7,123,760 B2 * | 10/2006 | Mullick et al. | | 382/131 |
| 7,444,009 B1 * | 10/2008 | Kieper et al. | | 382/128 |
| 7,636,484 B2 * | 12/2009 | Blaffert et al. | | 382/254 |

(Continued)

OTHER PUBLICATIONS

Commonly assigned: U.S. Appl. No. 11/942,021 entitled "Image Analysis of Tube Tip Positioning" by Huo et al., filed Nov. 19, 2007.

(Continued)

*Primary Examiner* — Jason M Repko
*Assistant Examiner* — Avinash J Yentrapati

(57) ABSTRACT

A method for displaying a radiographic image identifies a region of interest in a portion of the radiographic image, suppresses background image content within the identified region of interest, and enhances contrast of the image within the region of interest to form an enhanced region of interest. The enhanced region of interest is displayed within the remaining portion of the radiographic image.

5 Claims, 25 Drawing Sheets

(56) References Cited

U.S. PATENT DOCUMENTS

| | | | |
|---|---|---|---|
| 7,650,044 B2* | 1/2010 | Kreang-Arekul et al. | 382/274 |
| 2001/0038460 A1* | 11/2001 | Loce et al. | 358/1.9 |
| 2002/0037101 A1* | 3/2002 | Aihara | 382/167 |
| 2002/0150211 A1 | 10/2002 | Schmitz et al. | |
| 2004/0080661 A1* | 4/2004 | Afsenius et al. | 348/345 |
| 2004/0101183 A1* | 5/2004 | Mullick et al. | 382/131 |
| 2005/0025376 A1* | 2/2005 | Ishida | 382/254 |
| 2005/0027188 A1* | 2/2005 | Metaxas et al. | 600/410 |
| 2005/0100208 A1* | 5/2005 | Suzuki et al. | 382/157 |
| 2005/0207630 A1* | 9/2005 | Chan et al. | 382/131 |
| 2005/0213849 A1* | 9/2005 | Kreang-Arekul et al. | 382/284 |
| 2005/0265588 A1* | 12/2005 | Gholap et al. | 382/128 |
| 2005/0265632 A1* | 12/2005 | Eck et al. | 382/284 |
| 2006/0072785 A1* | 4/2006 | Davidson et al. | 382/100 |
| 2006/0088211 A1* | 4/2006 | Kusakabe et al. | 382/167 |
| 2006/0115178 A1* | 6/2006 | Fan et al. | 382/275 |
| 2006/0140477 A1* | 6/2006 | Kurumisawa et al. | 382/169 |
| 2006/0171573 A1* | 8/2006 | Rogers | 382/128 |
| 2007/0071341 A1* | 3/2007 | Pfister | 382/254 |
| 2007/0097443 A1* | 5/2007 | Ishiguro et al. | 358/3.26 |
| 2007/0191697 A1* | 8/2007 | Lynn et al. | 600/323 |
| 2007/0211928 A1* | 9/2007 | Weng et al. | 382/128 |
| 2007/0286522 A1* | 12/2007 | Moesle | 382/274 |
| 2008/0069415 A1* | 3/2008 | Schildkraut et al. | 382/128 |
| 2008/0088620 A1* | 4/2008 | Shih et al. | 345/420 |
| 2008/0107318 A1* | 5/2008 | Kiraly | 382/131 |
| 2008/0152254 A1* | 6/2008 | Kusakabe et al. | 382/275 |
| 2008/0246777 A1* | 10/2008 | Swanson et al. | 345/640 |
| 2008/0300480 A1* | 12/2008 | Meaney et al. | 600/420 |
| 2009/0129654 A1* | 5/2009 | Huo et al. | 382/132 |
| 2009/0169075 A1* | 7/2009 | Ishida et al. | 382/128 |
| 2009/0214099 A1* | 8/2009 | Merlet | 382/132 |
| 2009/0252395 A1* | 10/2009 | Chan et al. | 382/131 |
| 2010/0231593 A1* | 9/2010 | Zhou et al. | 345/428 |

OTHER PUBLICATIONS

Commonly Assigned: U.S. Appl. No. 11/644,858 entitled "Computer-Aided Tube and Tip Detection" by Huo et al., filed Dec. 22, 2006.

Commonly Assigned: U.S. Appl. No. 60/860,300 entitled "Computer-Aided Tube and Tip Detection" by Huo et al., filed Nov. 21, 2006.

Ballard et al., "Computer Vision, Chapter 3—Early Processing", 1982, Prentice Hall.

"Imaging Processing Toolbox for Use with Matlab, User's Guide, Verson 3", Jun. 2001, The Mathworks, Inc.

Russ, "The image processing handbook, $3^{rd}$ Edition", 1999, CRC Press Ltd., pp. 191-199.

Jankowski, "An iterated faced model approach to background normalization", Proceedings of the SPIE, No. 2238, Jun. 1994, pp. 198-206.

Abidi et al., "Facet Model and Mathematical Morphology For Surface Characterization", Proceedings of the SPIE, vol. 3837, Sep. 20, 1999, pp. 334-344.

* cited by examiner

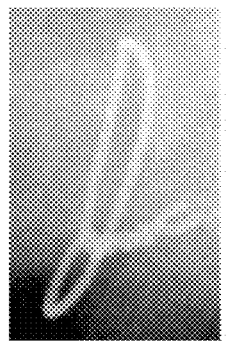 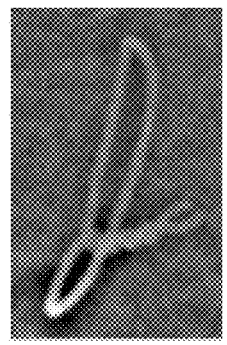

ENHANCEMENT OF REGION OF INTEREST OF RADIOLOGICAL IMAGE

CROSS REFERENCE TO RELATED APPLICATIONS

Priority is claimed from commonly assigned Provisional U.S. Patent Application Ser. No. 60/989,149, entitled "Enhancement of Region of Interest of Radiological Image" by Huo et al., filed Nov. 20, 2007, the disclosure of which is incorporated by reference in this application.

FIELD OF THE INVENTION

This invention generally relates to processing of diagnostic images and more particularly relates to a method and system for enhancing radiographic images in order to detect and display objects and tissue structures having low signal levels.

BACKGROUND OF THE INVENTION

Clinical evaluation of patients in an Intensive Care Unit (ICU) often relies heavily on diagnostic images, such as portable chest radiographic images, for example. It has been noted that chest radiographs can be particularly helpful in the ICU for indicating significant or unexpected conditions requiring changes in patient management. To meet the need for readily accessible and rapid diagnostic imaging, equipment such as portable chest radiography equipment has been developed, allowing the ICU clinicians to conveniently obtain a radiographic image as needed for the patient.

There can be considerable difficulty in detecting the proper position for various devices in the patient relative to patient anatomy, such as endo-tracheal (ET) tubes, feeding tubes (FT), and nasogastric (NT) tubes. Similar problems are faced whenever softer anatomy structures must be detected and differentiated from surrounding bone structure and foreign objects, such as clamps. Surrounding bone structures, termed background structures relative to the problem of tube and tip detection, effectively act as noise in many image evaluations, making it difficult to perceive softer structures and organs.

Even though the radiologist or technician has various tools for adjusting the displayed view of a digital radiographic image and heightening the contrast for features of interest, there can still be considerable difficulty in discerning softer tissues or soft tubing due to the high noise levels from background structures including skeletal structures and from foreign objects. Methods are needed for suppressing background structure noise and suppressing foreign objects and image artifacts in order to allow the structures and tissue of interest to be more readily visible in a displayed radiographic image.

SUMMARY OF THE INVENTION

An object of the present invention is to address the need for improved visibility of tubing and soft structures within a radiographic image. With this object in mind, the present invention provides a method for displaying a radiographic image comprising steps of identifying a region of interest in a portion of the radiographic image; selectively suppressing background image content within the identified region of interest; enhancing contrast of the image within the region of interest to form an enhanced region of interest; and displaying the enhanced region of interest within the remaining portion of the radiographic image.

The present invention provides computer-guided enhancement of an identified region of interest for display in order to help enable a clinician to make a more accurate assessment of the radiological image.

The method of the present invention allows treatment of image content over smaller regions of the full radiographic image so that image content exhibiting a relatively low signal level can be readily viewed.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIGS. 14A through 14G show a sequence of processing steps for object suppression in one example embodiment.

DETAILED DESCRIPTION OF THE INVENTION

Reference is made to commonly assigned (a) U.S. Patent Application Ser. No. 60/860,300 entitled "Computer-Aided Tube and Tip Detection" by Huo et al., filed Nov. 21, 2006; (b) U.S. patent application Ser. No. 11/644,858 entitled "Computer-Aided Tube and Tip Detection" by Huo et al., filed Dec. 22, 2006; and (c) U.S. patent application Ser. No. 11/942,021 entitled "Image Analysis of Tube Tip Positioning" by Huo et al., filed Nov. 19, 2007, the disclosures of which hereby are incorporated by reference in this application.

It is to be understood that elements not specifically shown or described in this description may take various forms well known to those skilled in the art. The description that follows focuses on enhancement for the display of an ET tube and surrounding tissue structures as one example of the method of the present invention. Those skilled in the art will appreciate that similar steps would apply for other types of display enhancement and object detection where there are soft tissues that are only minimally radio-opaque when compared with skeletal and other structures, with the necessary adaptation for display within surrounding anatomy.

The method of the present invention enhances the display of a region of interest (ROI) in the radiographic image by improving the signal-to-noise (S/N) ratio within the ROI. Conventional techniques for improving S/N ratio operate merely by increasing signal strength S. When considered as a ratio, this approach effectively increases the S/N ratio by increasing the numerator S value. Simply boosting the signal level, however, tends to inadvertently increase noise levels and thus can be a poor solution where low-level signals are of interest. This also has a negative impact on contrast. The method of the present invention, however, takes an alternate approach. Embodiments of the present invention first reduce the noise value N, lowering the denominator value in the S/N ratio. Then, once the noise level of the image has been reduced, the present invention provides contrast enhancement and tone scale adjustments to boost signal (S) content, improving the visibility of the lower signal-level structures of interest.

In the clinical setting, it is recognized that merely detecting the presence and path of an ET tube and its tip is not sufficient for determining whether or not the tube structure is able to perform its function. For the attending medical personnel, it is important to be able to ascertain that the tip of a tube is at the right position relative to the patient's anatomy. The method of the present invention takes this into account and provides the attending medical staff with an improved visualization of tip positioning suitability for the particular patient, as well as with improved visualization capabilities for other tissue and apparatus in the radiological image.

Figure 1:
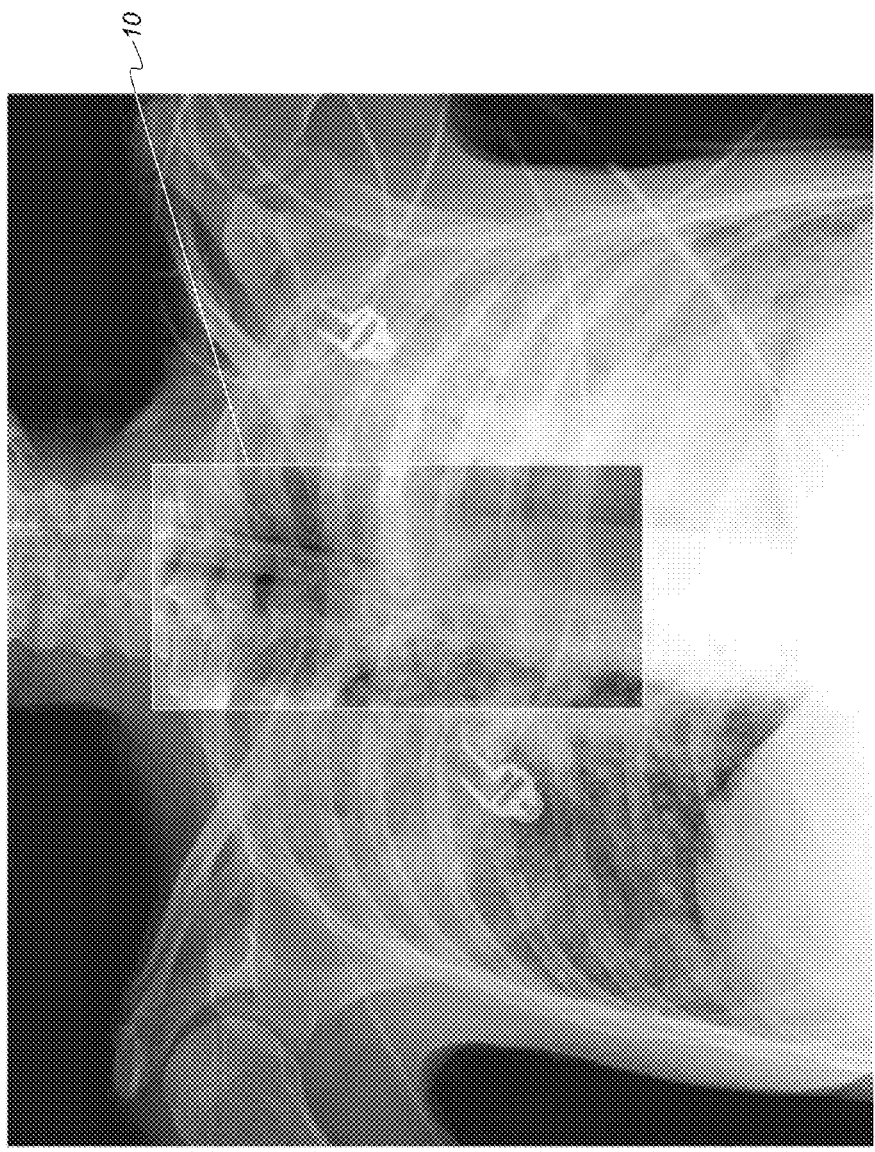
FIG. 1 is a view of a display of an enhanced region of interest (ROI) against a background of the radiography image.

Embodiments of the present invention enhance the appearance of an ROI that lies within a larger radiographic image, applying local image processing that helps to reveal structures that would otherwise be hidden in the full radiographic image. Referring to FIG. 1, there is shown a view of a display of a radiographic image with an inset enhanced ROI 10 used for trachea and ET tube tip detection. This type of display could be printed or could appear on a display monitor that is viewed by members of the medical staff who attend a patient. By narrowing attention to the ROI and providing special processing of the image data within this ROI to provide an enhanced ROI, the method of the present invention helps to improve the overall workflow for functions such as tube and tip detection.

The method of the present invention can be applied when using either manual detection by a user viewing the radiological image on a display screen or using computer-guided detection. Examples described in detail in this disclosure are directed to embodiments that solve problems of tube and tip detection. However, the methods described herein could be used for detecting any of a number of different foreign objects or disease conditions. The method of the present invention is particularly advantaged where a radiological image contains tissue structures or objects such as tubing or other plastic devices that exhibit a relatively low signal level when compared with skeletal and other structures within the radiological image.

Computer-guided tube and tip detection and display pose a particular challenge to radiological imaging. Attempts to process large portions of the image in order to show structures with low-level signals can be cumbersome, slow, and costly in terms of the needed computational and storage resources. A computer-guided detection and treatment of the ROI containing the particular structure or area that is of interest and including surrounding anatomic structure allows the removal or suppression of background structure noise. The background structure, such as skeletal structure, is certainly useful for some types of imaging, but is likely to interfere with the interpretation of weaker signals in the region of interest and is, therefore, considered to be "noise" with respect to this application. The removal or, more properly, suppression of strong background structure noise, such as that produced by spine and ribcage structures in the example shown in FIG. 1, is likely to improve the detection of weaker signals, such as those that are used to image the airway in the trachea. In this way, computer-guided display of the ROI can potentially improve visualization, improve tip detection accuracy and enhance other diagnostic functions.

Methods of the present invention work in conjunction with an operator interface that displays the region of interest that includes the particular structures of interest. In FIG. 1, a display shows the enhanced ROI 10 framed within its surrounding radiological image, shown here as 20. This display arrangement makes it clear to a viewer that special treatment has been provided for image content in ROI 10, in order to improve the visibility of structures within this region of interest. ROI 10 can be separately displayed; however, there are clear advantages to the display of enhanced ROI 10 framed within its actual position within radiological image 20, as shown in FIG. 1.

Embodiments of the present invention provide methods for enhancing the ROI within a radiological image to suppress background noise and foreign objects, improve tone scale, and remove structure noise. All of these improvements help with visualization of the image, whether on a display or in printed form. This, in turn, supports the clinician who examines the images, since visual examination remains the primary diagnostic tool for radiology, often supplemented by automated diagnostic processing.

Figure 2:
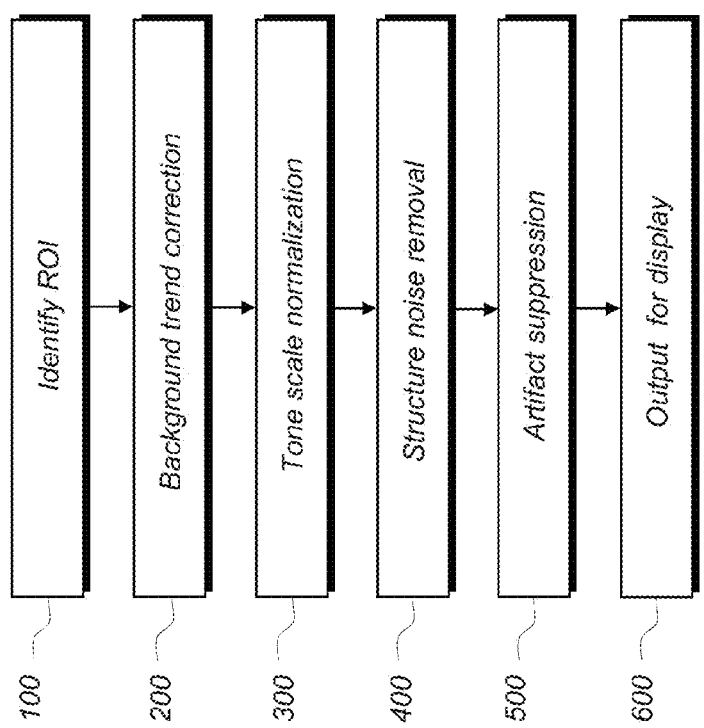
FIG. 2 is a logic flow diagram showing a basic sequence for ROI enhancement in one embodiment.

The logic flow diagram of FIG. 2 shows the overall steps that can be used for comprehensive tip detection, display, and improved visualization in one embodiment. An ROI identification step 100 identifies the region of interest within the input radiographic image. For ET tubing and tip detection, for example, this is the portion of the image in the vicinity of tube and tip, including trachea structures. ROI detection step 100 can be executed, for example, as described in the commonly assigned application to Huo et al., noted earlier. Subsequent steps in the process of FIG. 2 then process the image data within the ROI itself.

Still referring to FIG. 2, a background trend correction step 200 is then executed, in which background structure noise is suppressed. This helps to reduce the effects of noise resulting from larger high contrast objects, such as bone regions, that lie within the ROI. A contrast enhancement/tone scale normalization step 300 follows. In this step, the ROI, with background content suppressed, is further processed, with the tone scale of the resulting ROI adjusted to improve visibility and contrast within the range of brightness levels. Next, a structure noise removal step 400 helps to remove structure noise remaining within the ROI. An optional artifact suppression step 500 follows, in which foreign objects and other image artifacts are detected and suppressed. The resulting processed image can then be provided for viewing in a display step 600.

Background Trend Correction

As noted earlier, background features tend to be pronounced over features having lower signal amplitude. Background trend correction is used to compensate for this excessive contribution of background effects to noise.

In one embodiment, a $2^{nd}$ order surface is used to approximate the background trend. This is generally expressed as follows:

$$B(x,y) = ax^2 - by^2 - cxy - dx - ey - f$$

The fitting is approximated by minimizing the difference in the following:

$$\Sigma (I(x,y) - B(x,y))^2$$

where I(x,y) are image values. Parameters a, b, c, d, e, f can be determined based on a least squares fitting method, using techniques familiar to those skilled in the image processing art. The image after the correction is calculated as:

$$I_{corr} = (I - B) + k$$

where k is a constant value.

Figure 3B:
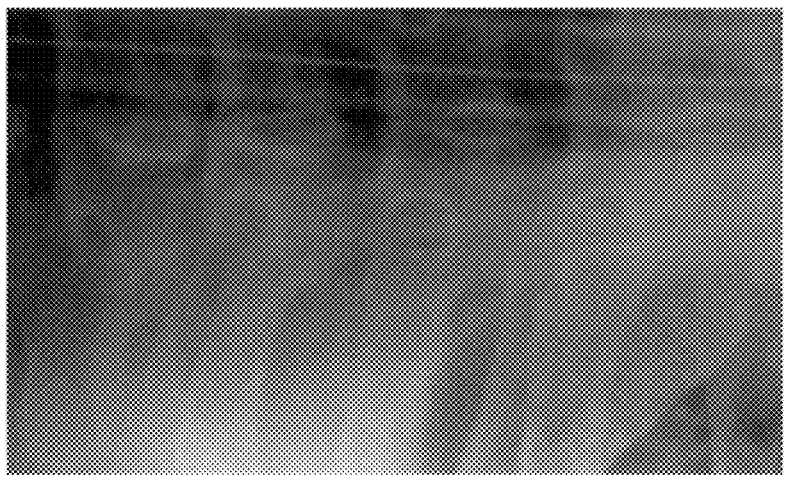
FIGS. 3A and 3B show an example ROI before and after background suppression, respectively.
Figure 3A:

By way of example, FIG. 3A shows an ROI having considerable background structure noise. FIG. 3B then shows the same ROI following background trend correction. Noise content is visibly reduced, helping to improve the visibility of lower-level signal content.

Figure 4A:
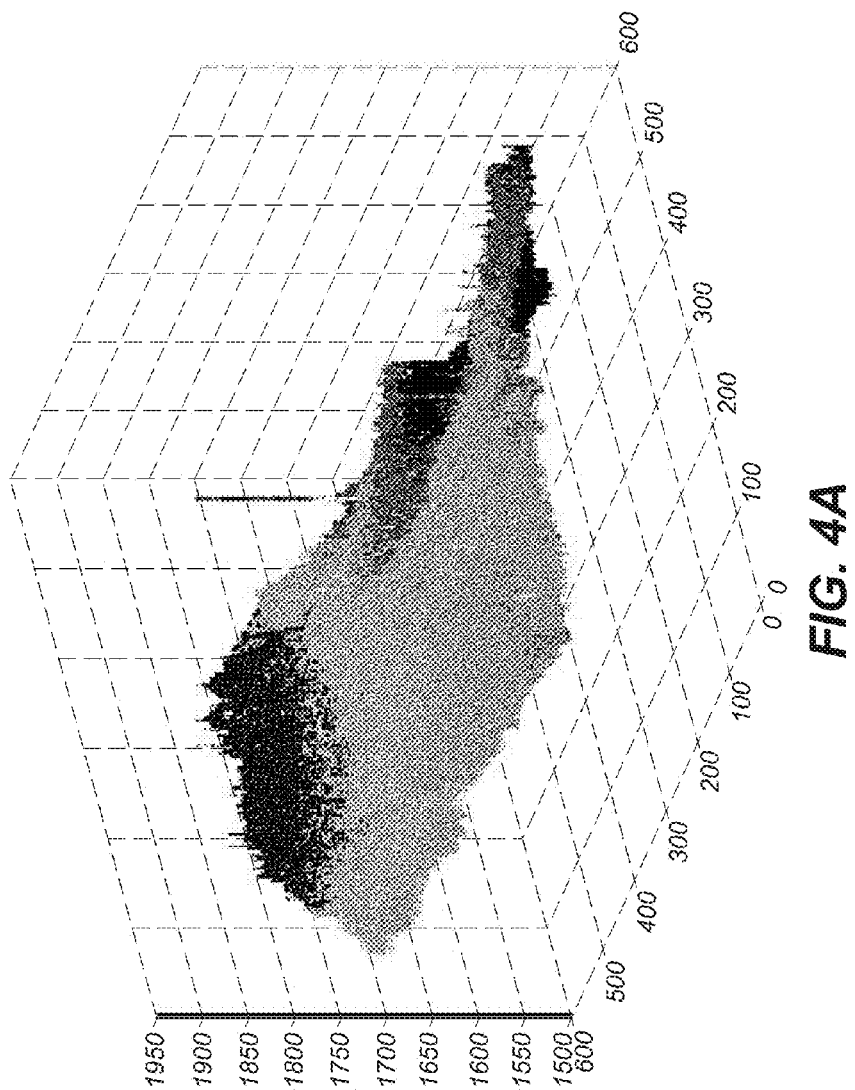
FIG. 4A shows a 3-dimensional plot of ROI image data prior to background trend estimation.
Figure 4B:
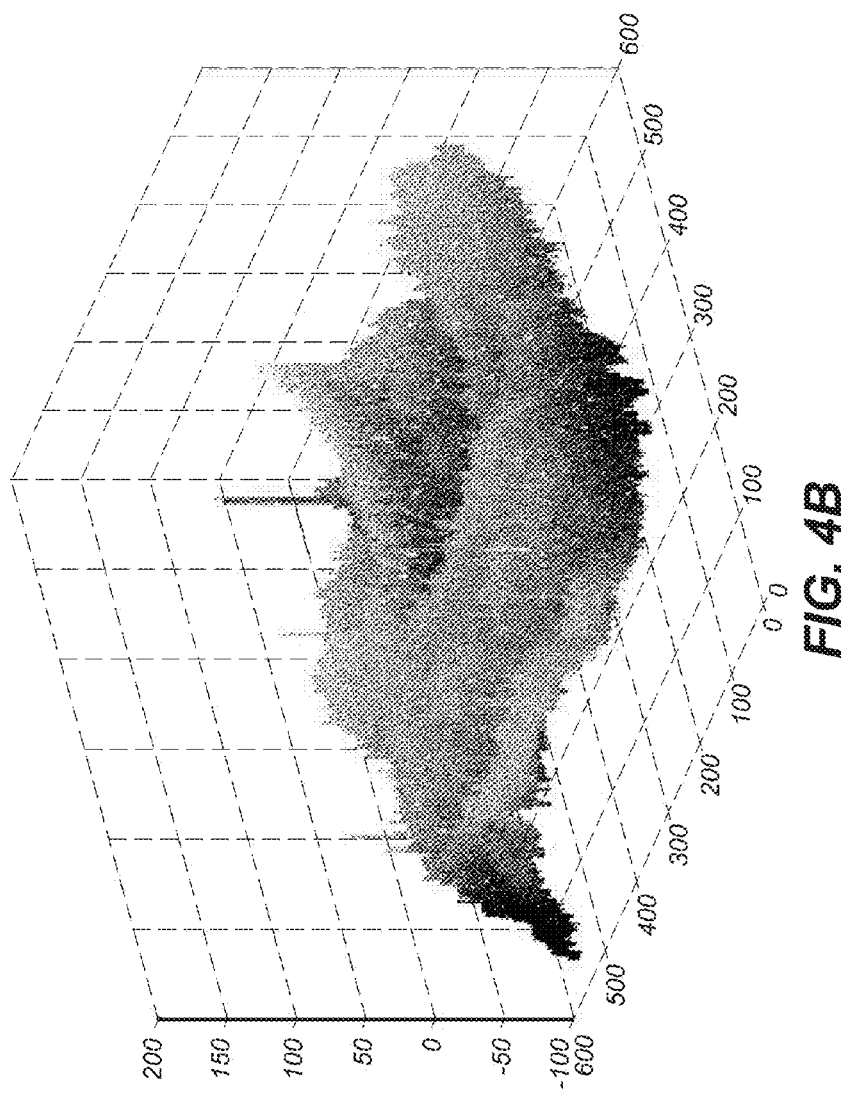
FIG. 4B shows a 3-dimensional plot of ROI image data following second order background trend correction.
Figure 4C:
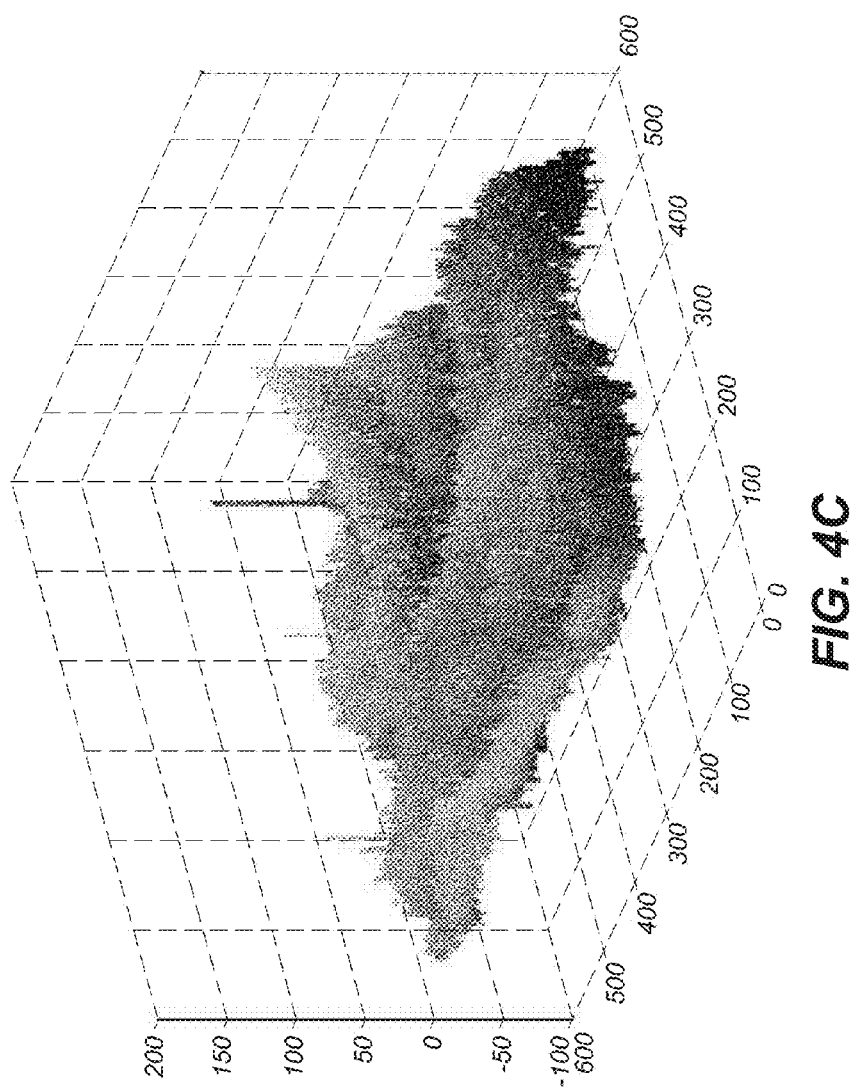
FIG. 4C shows a 3-dimensional plot of ROI image data following third order background trend correction.
Figure 4D:
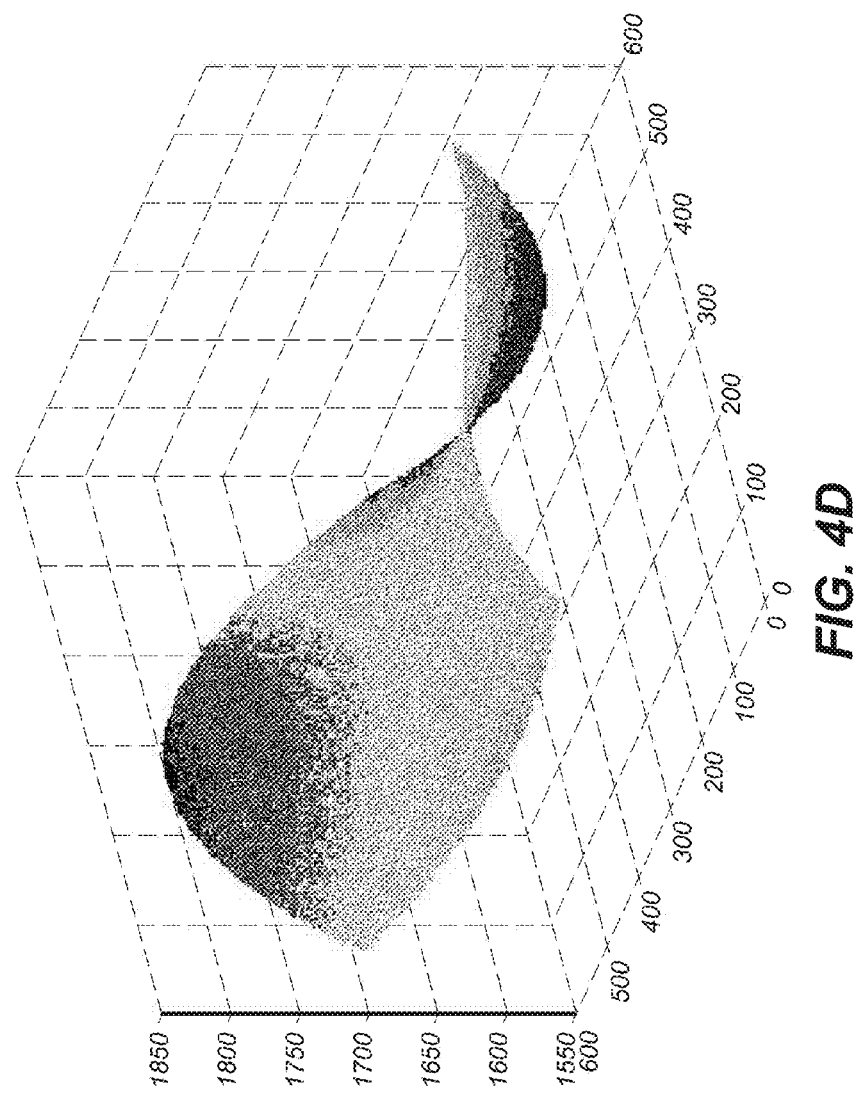
FIG. 4D shows a fitting surface used for background trend correction in one embodiment.

FIG. 4A shows the original data for an ROI. FIGS. 4B and 4C show image data values using second-order and third-order background correction, respectively. FIG. 4D shows an exemplary fitting curve used for background correction in one embodiment.

Weighted Multi-Sub-Region Background Trend Correction (BTC)

A refinement of background trend correction as just described handles situations in which the ROI is relatively large and a $2^{nd}$ order approximation does not sufficiently suppress the local background. In such a case, an adaptive sub-region-based background trend correction method can be used. For example, for a 2nd-order region-based background trend correction, the background value for a representative pixel (x0,y0) can be approximated from more than one neighboring sub-regions around (x0,y0) by using the following sequence.

a. Select n sub-regions around one pixel (x0,y0) within the ROI (choosing an appropriate value for n);
b. Calculate $B(x,y) = ax^2 - by^2 - cxy - dx - ey - f$ for each sub-region N;
c. Calculate an average weighted background (WB) for pixel (x0,y0);
d. Correct the background using I_corr=I−WB;

The least squares fitting is performed for each sub-region N (where N is from 1 to n):

$$\Sigma (I(x,y) - ax^2 - by^2 - cxy - dx - ey - f)^2$$

gives the points $B_N$ inside the ROI.

Parameters a, b, c, d, e, and f can be obtained as described earlier for background trend correction in general. After getting the a, b, c, d, e, and f values, the pixel's sub-region-based background trend correction (BTC) result can be expressed using, for each sub-region N:

$$I_{corr\_N}(x_0, y_0) = I(x_0, y_0) - a_N x_0^2 - b_N y_0^2 - c_N x_0 y_0 - d_N x_0 - e_N y_0 - f_N$$

or $$I_{corr\_N}(x_0, y_0) = I(x_0, y_0) - B_N(x_0, y_0)$$

The weighted background correction for pixel (x0,y0) from all n sub-regions can be expressed generally using:

$$I_{corr}(x_0, y_0) = \sum_{N=1}^{N=n} W_N(I(x_0, y_0) - B_N(x_0, y_0))$$

The above calculation is performed for each pixel in the ROI in order to correct for the local background. The weighting factors $W_N$, can be the same for all pixels or may be different.

Figure 5:
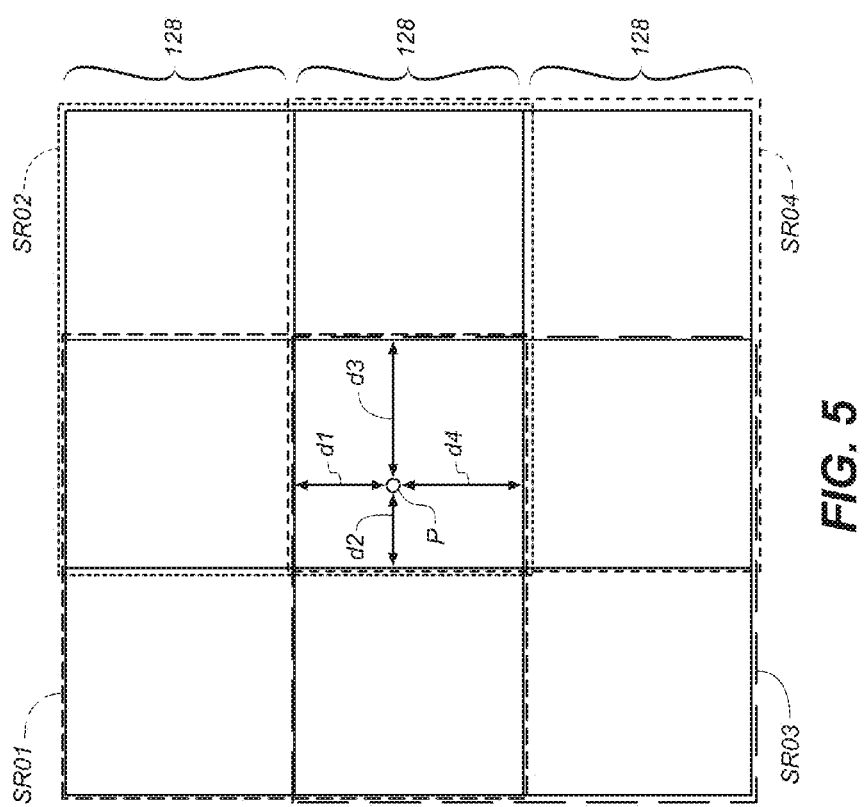
FIG. 5 shows kernel use in a multi-region background trend correction process according to one embodiment.

For example, for a 512*1024 ROI, if the selected size for a sub-region for background trend approximation is 256*256, then a background trend correction spanning every 128 pixels can be performed. Referring to FIG. 5, there is shown a 3×3 (alternately expressed as 3*3) arrangement of kernels, with a size of 128×128 pixels each, used in one embodiment. For a pixel P (shown enlarged in scale in FIG. 5) in a central kernel of the 3×3 arrangement of kernels, there may be four different results from background trend estimation processing, one result based on each of the four sub-regions (256×256) around the central 128×128 kernel. Combining these four results using a method similar to bilinear interpolation, or other suitable method, provides the final estimation of background value for pixel P.

Again, FIG. 5 shows only one exemplary application of this method, using 128*128 tiles. Here, four sub-region background trend correction values could be obtained for the central area shown, depending on which larger 256*256 sub-region includes this area. FIG. 5 shows four smaller sub-regions (each 256×256), labeled SROI1, SROI2, SROI3, and SROI4, with the middle overlap area as shown. For this example, where background trend correction results for SROI1, SROI2, SROI3, SROI4 are $Ic_1$, $Ic_2$, $Ic_3$, $Ic_4$, respectively, then the following weighted calculation can be used:

$$I_{corr} = I_{c1}\left(\frac{d1}{d1+d4} \cdot \frac{d2}{d2+d3}\right) + I_{c2}\left(\frac{d1}{d1+d4} \cdot \frac{d3}{d2+d3}\right) + I_{c3}\left(\frac{d4}{d1+d4} \cdot \frac{d2}{d2+d3}\right) + I_{c4}\left(\frac{d4}{d1+d4} \cdot \frac{d3}{d2+d3}\right)$$

In this example, the weighting factors for each pixel (x,y) in the central kernel are determined by its distances to the four corners of the central kernel.

If the pixel (x0,y0) is located at the edge of the image, two background trend correction results can be combined. For pixel (x0,y0) at a corner, a single background trend correction value would be used.

Noise Smoothing

A number of alternatives are available for noise smoothing. In one embodiment, a 3*3 median filter is used to help diminish the noise on the processed result. This method can be applied to different sub-region sizes.

Weighted Combination of Images Corrected with Different Sub-Region Size

Figure 6:
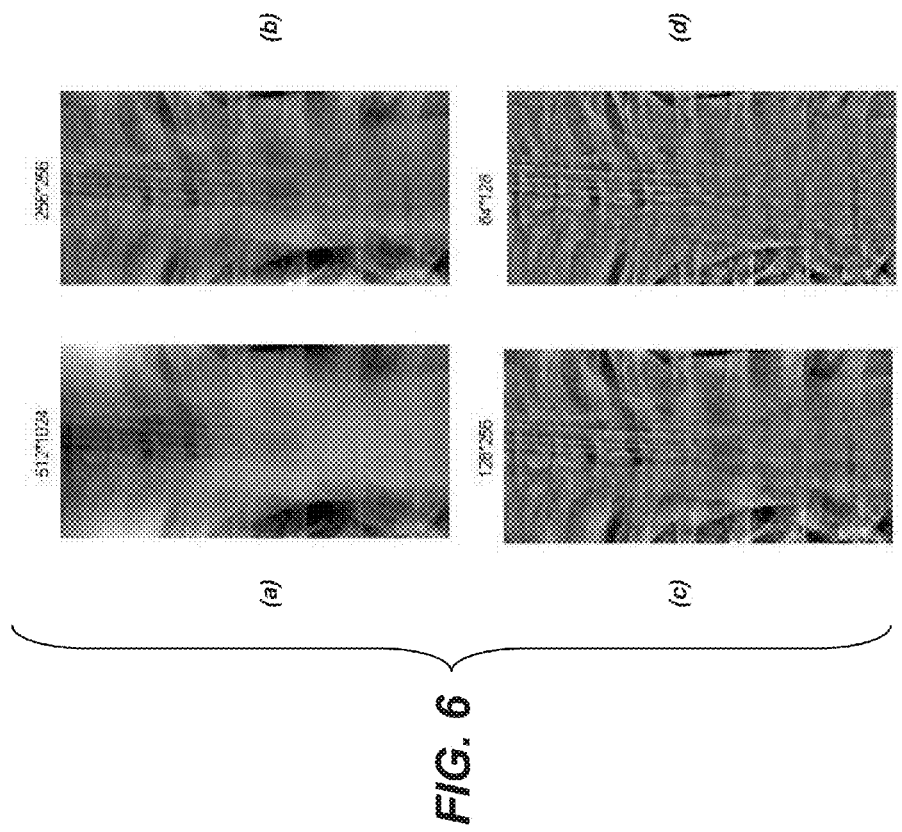
FIG. 6 shows results of background trend correction using progressively smaller kernel dimensions.

FIG. 6 shows examples of ROI processing using different kernel sizes for background trend correction. For image 6(*a*), the entire 512×1024 ROI is used as the kernel for background trend approximation. For image 6(*b*), a 256×256 kernel is used. At image 6(c), a 128×256 kernel is used, At image 6(d), a smaller 64×128 kernel is used.

Using smaller kernels enables higher frequency band information by removing the low frequency image content. However, for low-medium and medium-high frequency components, this is also needed for enhancement. Thus, a combination of weighted correction from different kernel sizes can be performed using the following formula:

$$I_{combined} = g_0 I_{512*1024} + g_1 I_{256*256} + g_2 I_{128*256} + g_3 I_{64*128}$$

For each image, the value of g can be changed to determine the frequency contents retained in the corrected image.

Figure 7:
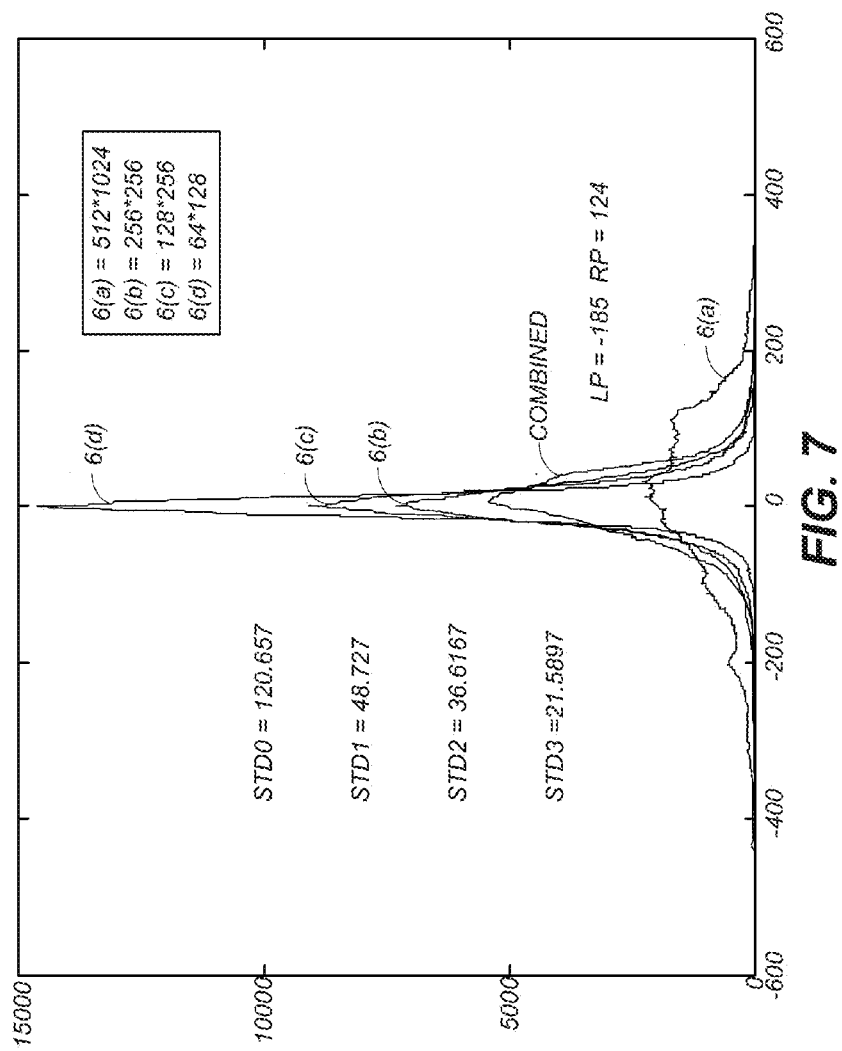
FIG. 7 is a histogram showing the pixel value distributions for the images shown in FIG. 6.

FIG. 7 shows histogram distributions for the different kernel sizes applied to obtain the results shown in FIG. 6. As is shown here, the flattest image appearance, that of FIG. 6(d), has the highest number of pixels centered about one value, indicating that the low-frequency background has been removed from the background corrected image.

Figure 8:
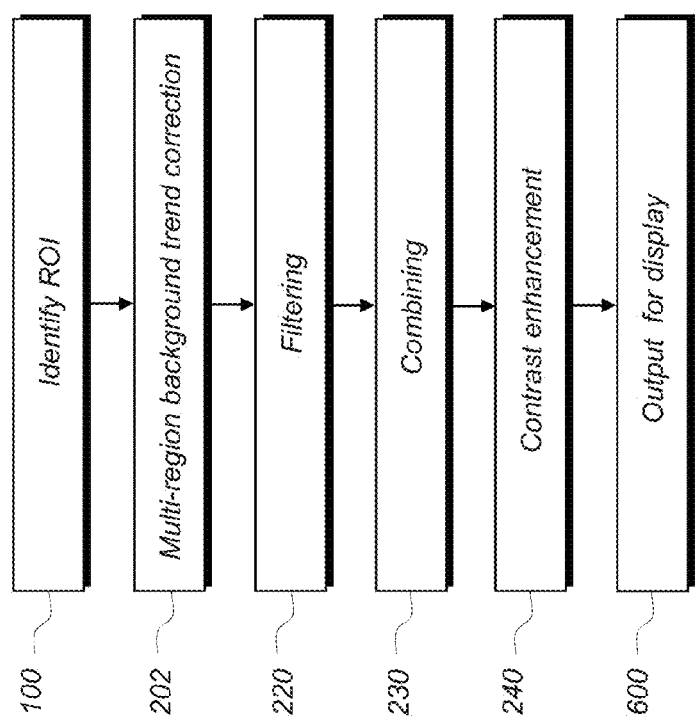
FIG. 8 shows a logic flow diagram for ROI enhancement using multi-region background trend correction.

FIG. 8 shows a logic flow diagram for ROI enhancement using multi-sub-region background trend correction. ROI identification step 100 identifies the ROI. A multi-sub-region background trend correction step 202 is then executed, using the procedure just described. A filtering step 220 helps to remove noise, using a Gaussian filter or other suitable filter type. In one embodiment, a 3*3 median filter is employed for removing high-frequency or "white" noise from the processed result of earlier processing steps.

A combining step 230 then combines results following filtering step 220. This can be used to combine weighted proportions of results for different kernel sizes using:

$$I_{combined} = g_0 I_{512*1024} + g_1 I_{256*256} + g_2 I_{128*256} + g_3 I_{64*128}$$

where values $g_0, g_1, g_2,$ and $g_3$ are empirically determined and the symbols $I_{512*1024}, I_{256*256},$ and $I_{64*128}$ stand for the results of background trend correction using different kernel sizes. This includes some portion of low and middle frequencies, with high-frequency noise suppressed.

Figure 9:
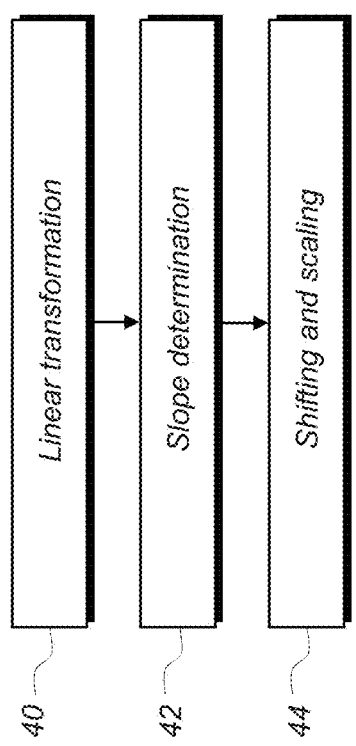
FIG. 9 is a logic flow diagram showing steps for contrast enhancement in one embodiment.
Figure 10:
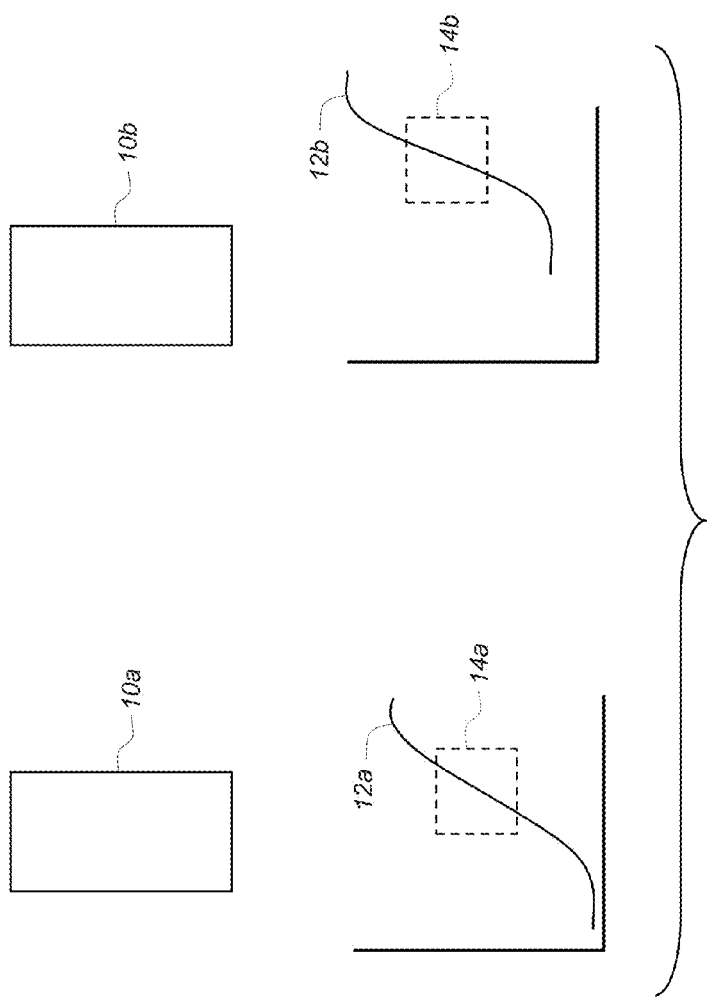
FIG. 10 shows mapping of response curves from the original ROI to a mapped ROI.

Still referring to the logic flow diagram of FIG. 8, a contrast enhancement step 240 then provides enhancement for visualization of image contrast. In one embodiment, contrast enhancement maps pixels from their ROI values to mapped-ROI values using the basic sequence shown in FIG. 9. A linear transformation step 40 is first carried out. A slope computation step then determines the slope of curves 12a and 12b. A shifting and scaling step 44 is then used to obtain the necessary conversion data. This basic sequence is illustrated graphically in FIG. 10. The goal is to map an ROI 10a having corrected values after background trend correction to a mapped ROI 10b with values enhanced for contrast that is optimized for viewing the object of interest. Each ROI 10a and 10b has a corresponding response curve 12a and 12b. Within each of these response curves is a corresponding linear region in which pixel values lie, linear regions 14a and 14b for ROIs 10a and 10b, respectively.

Figure 11:
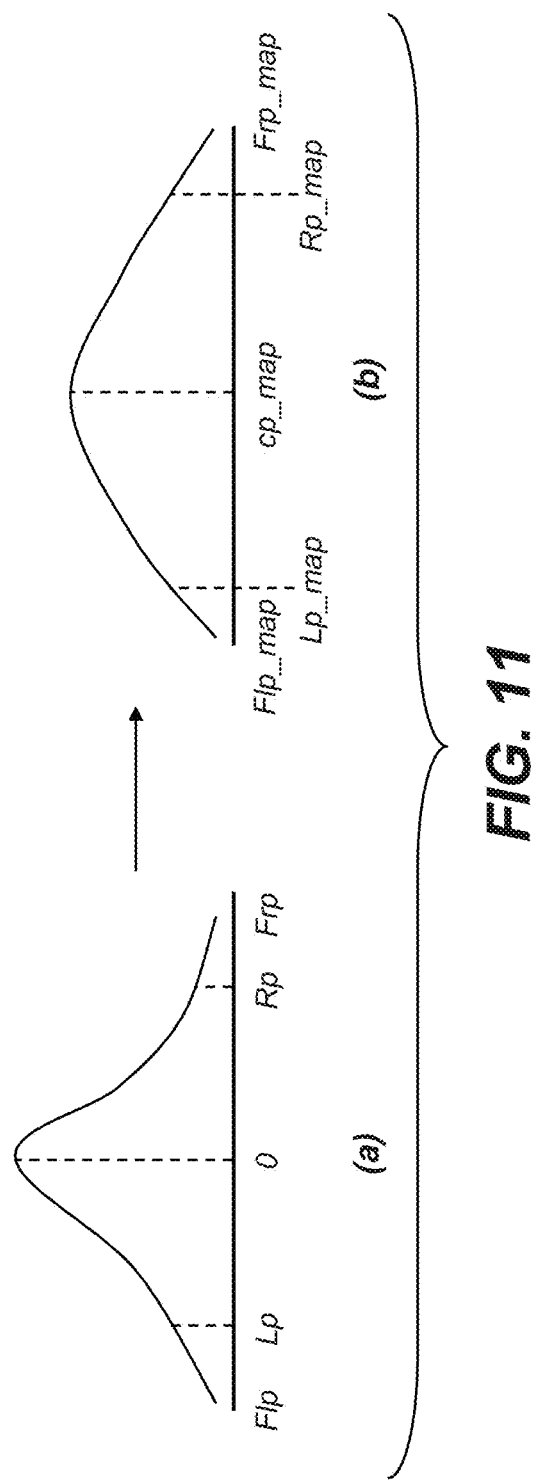
FIG. 11 shows histograms for the distributions of original and mapped ROI values.

The graphs of FIG. 11 show key points for the original (a) and mapped (b) histogram distributions of data value, numbered 22 and 24, in the contrast enhancement process.

Normalization

After obtaining combination results based on multi-sub-region background trend correction, analysis of the histogram and cutting p % enable calculation of the main range of the image [lp, rp], as shown in FIG. 11. The original 0 value is mapped to value cp_map, and values lp and rp are mapped to lp_map and rp_map, respectively. The effective left and right points are obtained to construct the look-up table (LUT) mapping [flp, lp] to [flp_map, lp_map] and [rp,frp] to [rp_map, frp_map].

In some images, because of the low exposure dose, this method can sometimes excessively enhance the image and cause too much noise as a result. To prevent this, an LUT slope limitation can be determined based on the average code value of the raw image. If the mean code value exceeds a threshold, indicating a lower radiation dose, the slope limitation can be set lower.

Normalization Steps

Normalization steps follow this sequence in one embodiment:

(i) Analyze the histogram of the background trend corrected images and determine the main range of the histogram [lp, rp]. The histogram usually centers around a gray value of 0 shown in FIG. 7. Values for lp and rp can be determined as 10% of the lowest and highest pixel or at some other value to cover the main range of the image.

(ii) Determine the effective left point (flp) and right point (frp). The corresponding points in the mapped images for lp, rp, flp and frp are lp_map, rp_map, flp_map and frp_map.

The center point of the histogram for a background corrected image has a gray value of 0. The mapped value for center point (cp=0) is labeled cp_map.

The look-up-table (LUT) for mapping [lp,cp] to [lp_map, cp_map] is constructed using the following:

$$x\_map = cp\_map + slope*x, \quad lp \leq x \leq rp$$

where slope is calculated as follows:

$$slope\_l = \frac{cp\_map - lp\_map}{cp - lp}$$

$$slope\_r = \frac{rp\_map - cp\_map}{rp - cp}$$

$$slope = \min(slope\_l, slope\_r)$$

In an example embodiment, the following empirically determined values are used:

cp_map: 110
lp_map: 20
rp_map: 220
flp_map: 5
frp_map: 235

Limitations can be set on the slope to prevent this method from enhancing noise excessively in low exposure areas, using the following:

$$Slope\_limitation = \begin{cases} (1 - 0.4*(meancodevalue - 1400)/1300), & \text{if } 1400 \leq meancodevalue \leq 2700 \\ 0.6, & \text{if } meancodevalue > 2700 \\ 1, & \text{if } meancodevalue < 1400 \end{cases}$$

where meancodevalue is equal to the average gray value of the ROI before background trend correction.

If slope>slope_limitation for the range of the corresponding meancodevalue, then slope=slope_limitation $$x\_map = cp\_map + Slope\_limitation * x, \quad lp \leq x \leq rp$$

The mapping from [flp, lp] to [flp_map, lp_map] and from [rp,frp] to [rp_map,frp_map] can be done in a similar way.

Foreign Object Identification

Figure 12:
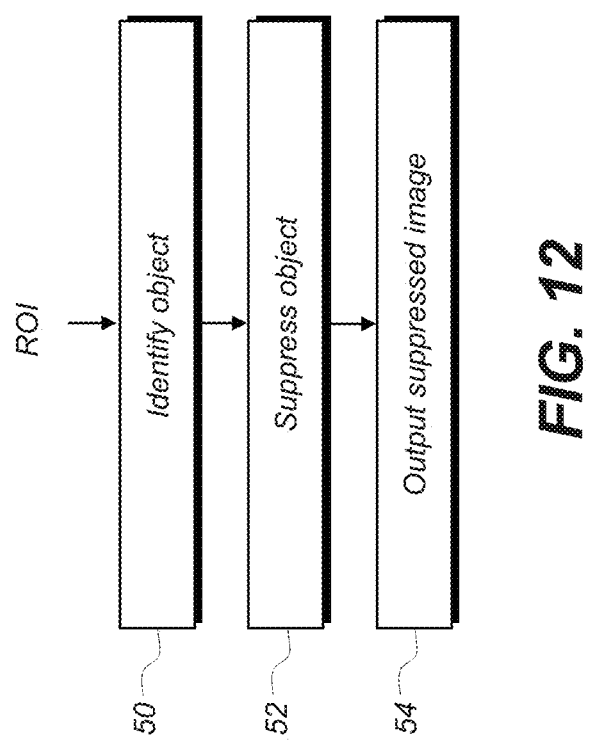
FIG. 12 is a logic flow diagram showing object suppression steps.

Foreign object or artifact suppression helps to minimize the effects of image analysis problems that occur where substantially radio-opaque structures tend to make weaker signals difficult to perceive. The logic flow diagram of FIG. 12 shows the basic steps used for artifact identification and suppression according to one embodiment of the present invention. The process operates upon an input ROI. An object identification step 50 identifies object structure. A suppression step 52 is then executed in order to compensate for the presence of the detected object artifact in the image. An output step 54 is then performed, providing the processed image as output.

Figure 13A:
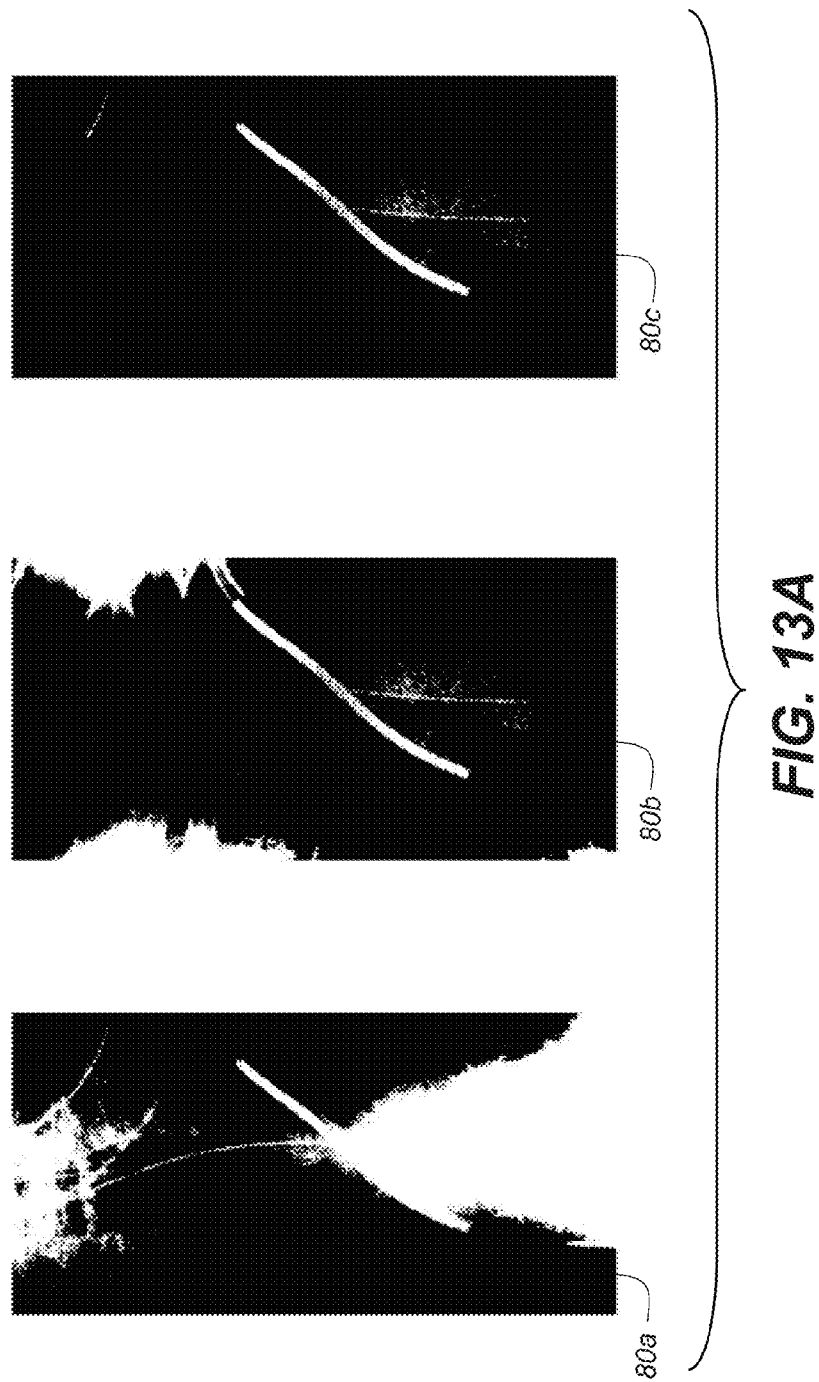
FIGS. 13A and 13B show a sequence for object identification.
Figure 13B:
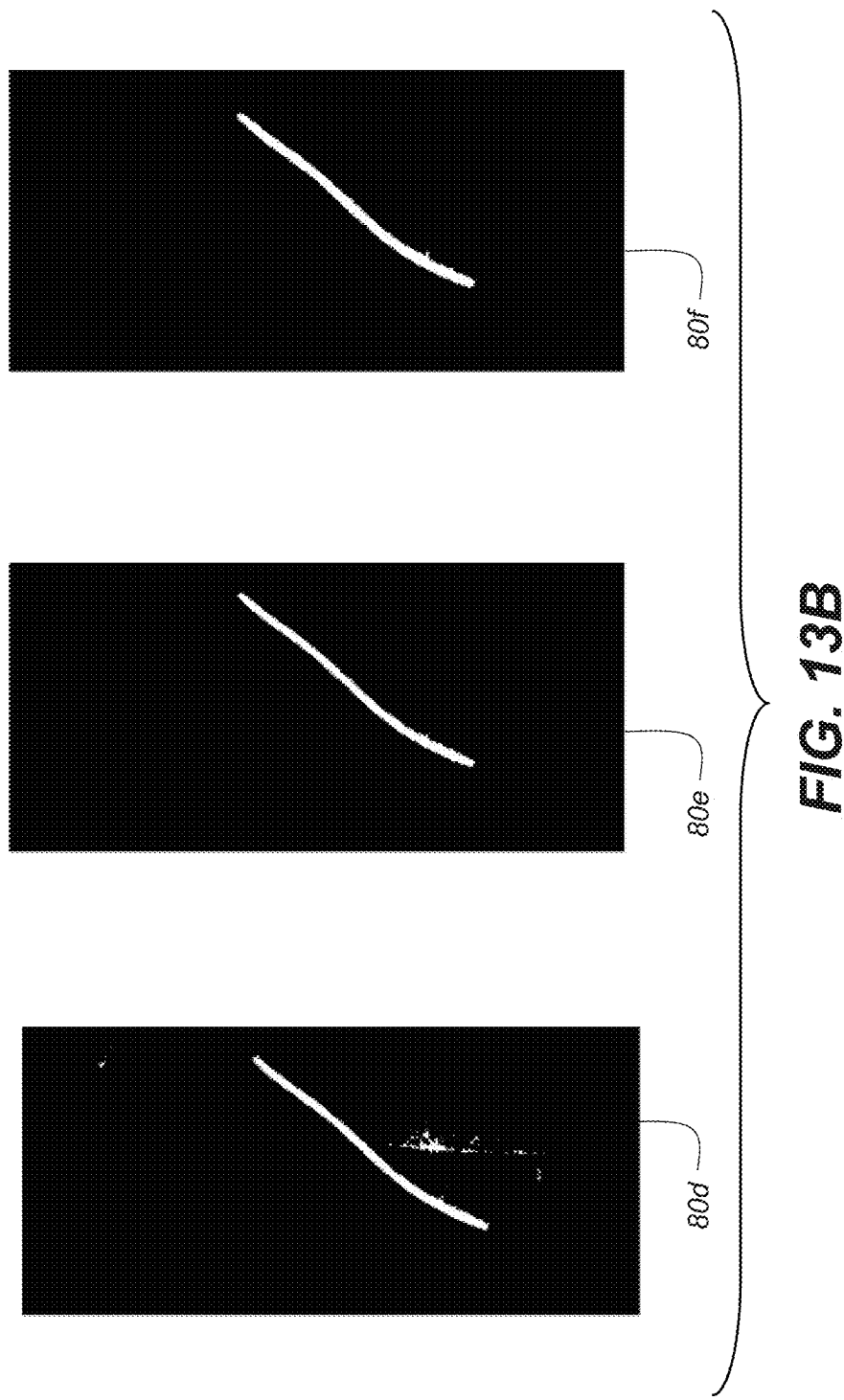

Object identification step 50 can be performed in a number of ways. In one embodiment, shown in the example of FIGS. 13A and 13B, the following basic sequence is executed:

1. Apply one or more thresholds to form a threshold image and begin to detect the structure in a known density range. For example, set a high density threshold, for pixel values PV>10%. Referring to FIG. 13A, this provides a threshold image 80*a*.

Subsequent steps 2 through 4 then help to isolate the object that is causing the artifact from its background content.

2. Perform a morphological (eroding) operation on the threshold image using an appropriate kernel size (e.g. 5×5) to accentuate the detected structure. This provides the progression of images shown at 80*b* and 80*c* of FIG. 13A.

3. Remove isolated small regions around the structure of interest following erosion, providing FIG. 13B image 80*d*.

4. Label the remaining structure of interest after removing the isolated small regions, as in image 80*e* of FIG. 13B.

5. Perform a morphological (dilate) operation using a kernel size (e.g., 5×5) on the remaining structure of interest. This provides an image 80*f* of FIG. 13B that clearly identifies the structure of the object artifact, isolated from background content.

6. Output the structure after dilation.

Suppression Techniques

Suppression techniques replace image data for one or more pixels identified within the object with calculated values. Given the identified structure or artifact from object identification step 50, the following are some of the possible methods that can be used for object suppression. The performance of some of these methods relates generally to artifact size, as noted.

Method 1. This method generally works well for larger artifacts:

1. Select an artifact region surrounding the identified structure.
2. Calculate the average pixel value and variation for all the pixels within the region, but outside of the identified structure.
3. Replace the pixels in the structure with the average pixel value+/−x. Where x is a randomly selected value that lies between 0 and the variation calculated in the preceding step (step 2).

Method 2. This method uses a type of background approximation:

1. Select a region R that includes the identified structure S.
2. Perform a background surface fitting for the selected region, excluding the pixels within the identified structures.
   $B(x,y) = ax^2 - by^2 - cxy - dx - ey - f$, where $x,y \in R-S$ and a, b, c, d, e, and f are empirically determined fitting parameters.
3. Replace the pixel values in the identified structure S with the background value calculated in the preceding step $B(x,y)$, $x \in S$ (step 2).

Method 3. This suppression technique uses a painting method best suited for smaller objects:

1. Identify a single artifact sub-region containing the artifacts that cover multiple sub-regions. These artifacts are first considered as missing data as they are masked out from the region.
2. Divide the artifact sub-region into an array of small blocks, each of a smaller kernel size, such as (9*9) or other suitable dimensions.
3. Assign a rating to each block based on features such as gradient and percentage of missing data (data masked out) calculated from each block.
4. Rank each block based on the rating. The highest ranked block usually has the least missing data. The ranking can be based on a single feature or multiple features.
5. Start with the highest ranking block and search for the closest match for the block.
6. Search the best match from pre-defined regions of interest (ROIs). The ROIs can be the entire image, or selected area in the image. Replace pixels with these matching values.

This search continues until all the missing data is filled.

It can be appreciated that a number of other suppression techniques could be employed, all within the scope of suppression described for the present invention.

Figure 14A:
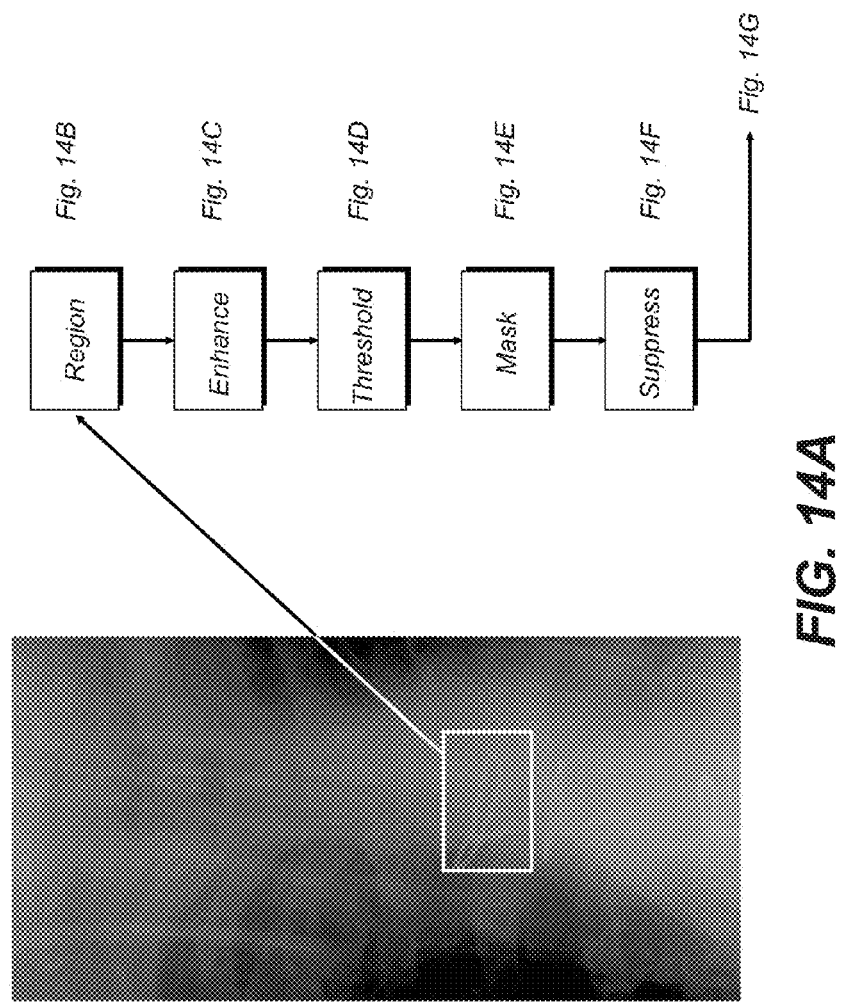
Figure 14D:
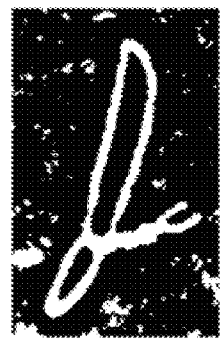
Figure 14E:
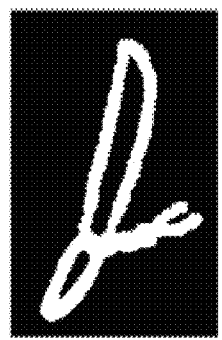
Figure 14F:
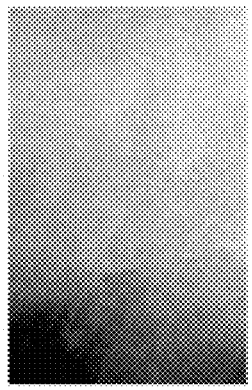
Figure 14G:
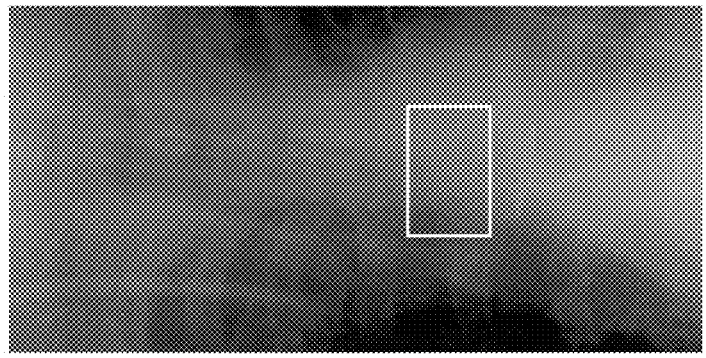
Figure 15B:
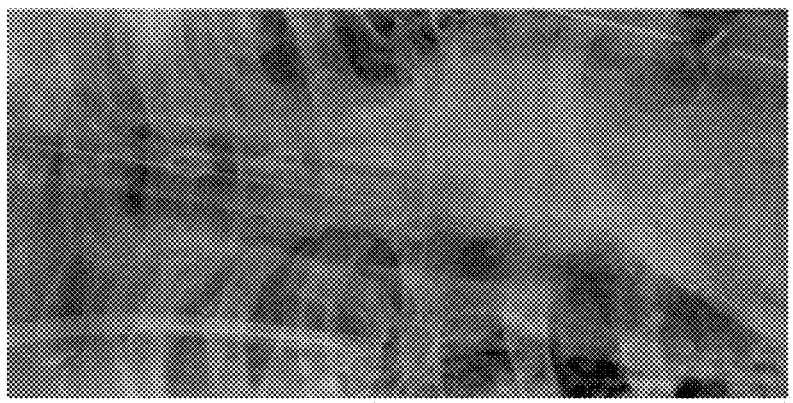
FIG. 15B shows the same ROI following artifact removal.
Figure 15A:
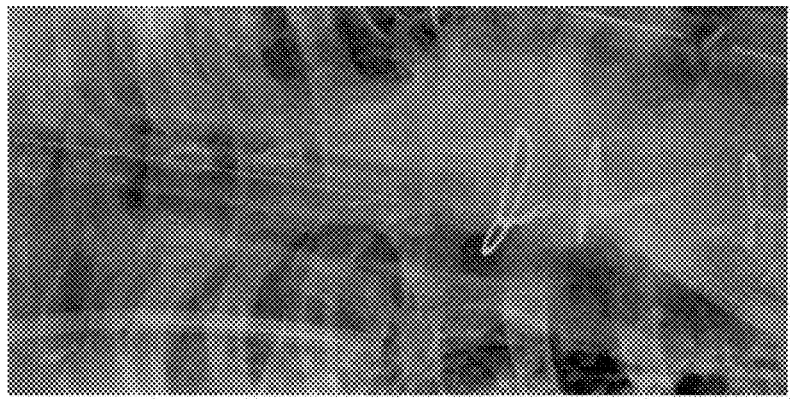
FIG. 15A shows an ROI having multiple object artifacts.

The sequence of FIGS. 14A through 14G show a progression of process stages for object suppression for a suture, typical of small object removal using Method 3 outlined earlier. FIG. 14A shows the ROI with the sub-region containing one object artifact that should be suppressed. FIG. 14B shows this sub-region separate from the ROI. FIG. 14C shows an enhanced version of this object. FIG. 14D shows the results of a thresholding operation. FIG. 14E shows a mask formed using the thresholding results. FIG. 14F shows the results of pixel replacement for object suppression. The result of suppression processing for this object within the full ROI is shown in FIG. 14G. FIGS. 15A and 15B show an ROI before and after object suppression.

Figure 16:
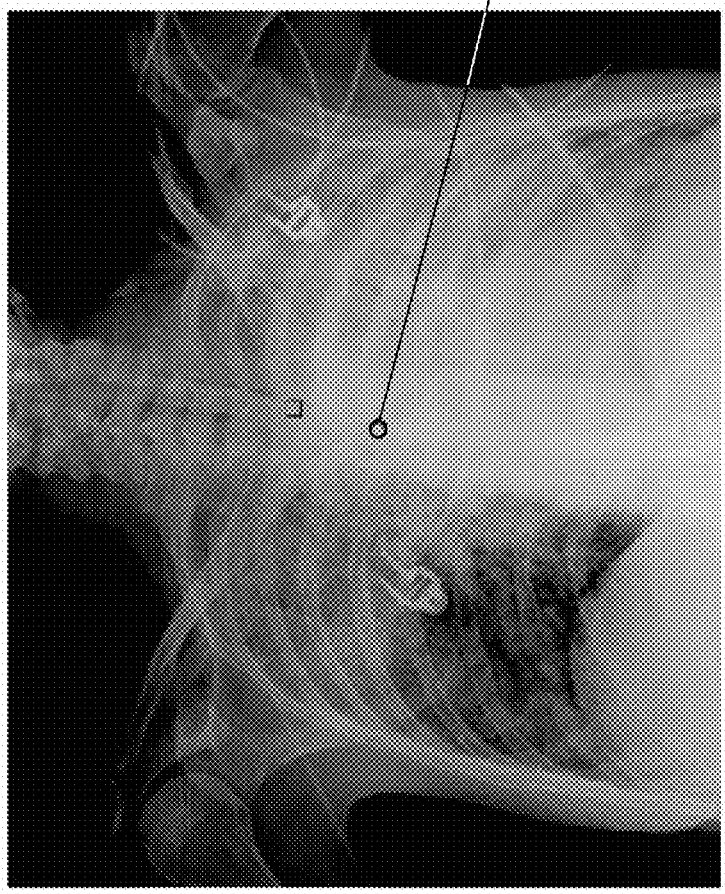
FIG. 16 shows a radiological image that displays a marker for ET tube tip and carina detection.
Figure 17:
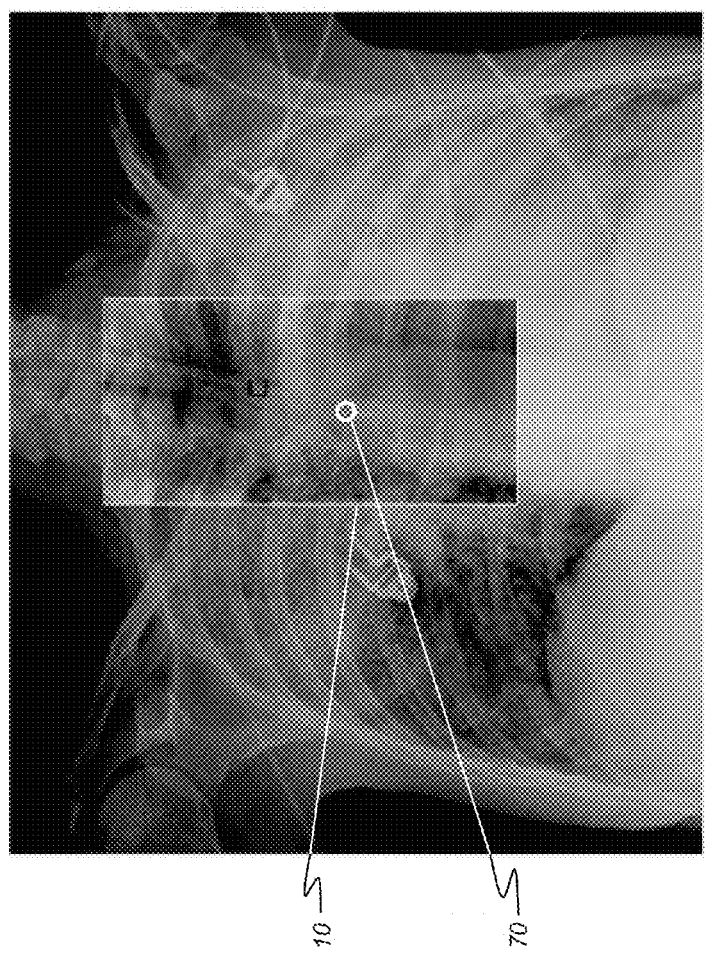
FIG. 17 shows an example display with added ROI visibility provided using methods of the present invention.

FIG. 16 shows, at a reduced scale, a radiological image that displays a marking 70 for ET tube tip and trachea detection. This type of display might be provided, for example, as the result of CAD processing of the radiological image content. However, as can be seen from FIG. 16, other than providing marker 70, very little else is done by conventional imaging systems to make this detection more readily visible. FIG. 17 then shows the added visibility that is provided using methods of the present invention. Here, marker 70 is shown within ROI 10. The tubing, trachea, carina and other related structures are now much more readily visible.

A range of functions can be provided to the operator to enable ROI enhancement and display as well as to manipulate various parameters used for the enhancement, in order to provide additional visibility. For trachea, tube tip, and carina detection and display, identification and treatment of the ROI can be manual or automated. Using manual detection, an operator viewing the radiological image can specify an ROI within a full-sized image, using conventional user interface utilities for pointing to objects displayed on a screen, such as a mouse or touch screen panel, for example. Entry of an operator command can then be used to enable the display of enhanced ROI results. With either computer-assisted or manual ROI detection, the viewer can be given the capability to toggle between enhanced ROI display, as described herein, and conventional full-image display without the enhanced ROI shown.

While examples given here elaborate on applications for tube tip and trachea display, similar processes could be employed for enhanced ROI display in other anatomical regions. As noted earlier, the method of the present invention helps to improve the signal-to-noise ratio over a portion of a larger image, enabling low-level signals, such as those from particular tissue structures or foreign objects, to be enhanced.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, various additional controls and operator settings could be added to a user interface in order to adjust threshold levels, increase or decrease ROI size, and alter the contrast characteristics in order to optimize display of the ROI. Thus, what is provided is a method and system for enhancing diagnostic images in order to detect objects and tissue structures having low signal levels.

PARTS LIST

| | |
|---|---|
| 10, 10a, 10b. | Region of Interest |
| 12a, 12b. | Curve |
| 14a, 14b. | Linear region |
| 20. | Image |
| 22, 24. | Histogram |
| 40.-54. | Method steps |
| 70. | Marking |
| 80a, 80b, 80c, 80d, 80e, 80f. | Region |
| 100.-600. | Method steps |

The invention claimed is:

1. A method carried out by a computer for displaying a radiographic image comprising:
    identifying a region of interest in a portion of the radiographic image; the region of interest including low interest, high signal level image content including anatomical structures and non-anatomical foreign objects which overlap high interest image content exhibiting a relatively low signal level;
    suppressing the low interest, high signal level background image content including anatomical structures and non-anatomical foreign objects within the identified region of interest and enhancing contrast of the overlapping high interest image content exhibiting a relatively low signal level within the region of interest without enhancing the overlapping low interest, high signal level image content, thereby to form an enhanced region of interest; and
    displaying the enhanced region of interest within the remaining portion of the radiographic image;
    further comprising suppressing artifacts within the identified region of interest wherein suppressing artifacts comprises:
        identifying an object by applying a threshold to detect the object within the region of interest;
        isolating the object from background content; and
        replacing image data for one or more pixels identified within the object with calculated values wherein replacing image data for one or more pixels comprises:
            identifying an artifact region that contains the object;
            dividing the artifact region into an array of smaller blocks;
            ranking each block according to relative percentage of missing data that are identified as artifacts; and
            replacing missing pixels of each block with predetermined substitute pixel values.

2. The method of claim 1 wherein isolating the object from background content comprises:
    applying one or more thresholds to form a threshold image;
    performing a morphological erosion operation on the threshold image to accentuate a structure in the image;
    removing isolated regions around the structure; and
    performing a morphological dilation operation on the structure to isolate the object.

3. The method of claim 1 wherein replacing image data for one or more pixels comprises:
    identifying an artifact region that contains the object;
    performing a background surface fitting for the artifact region, excluding pixels associated with the object; and
    replacing pixel values according to the background surface fitting.

4. The method of claim 1 wherein replacing image data for one or more pixels comprises:
    identifying an artifact region that contains the object;
    calculating the average pixel value and variation for a plurality of pixels within the region, but outside of the identified object; and
    replacing pixel values according to the calculated average pixel value and variation.

5. The method of claim 1 wherein the radiographic image comprises an externally inserted tube including one or more of a catheter, an endo-tracheal tube, a feeding tube, and a nasogastric tube.

* * * * *